Patented June 2, 1925.

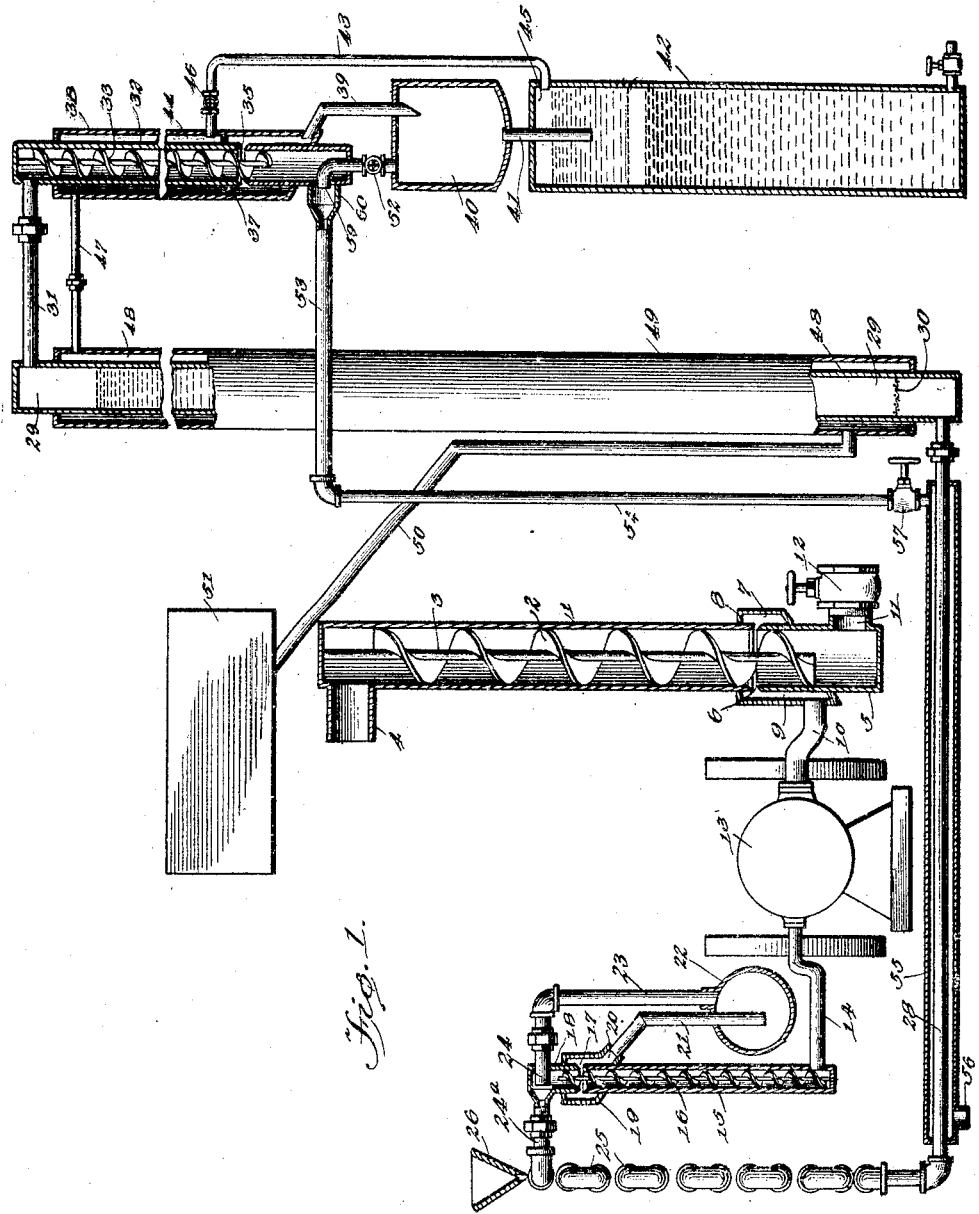

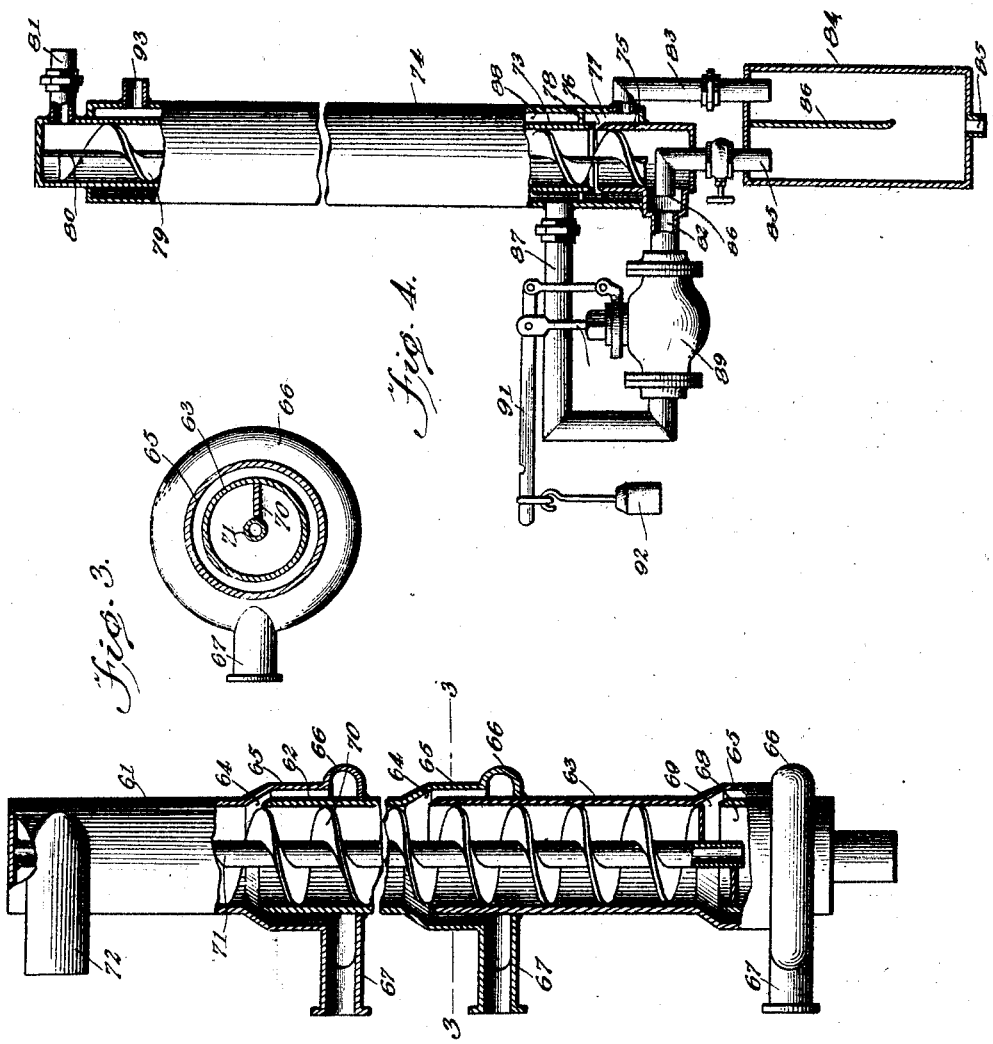

1,539,968

UNITED STATES PATENT OFFICE.

CHARLES F. W. TABLER, OF TAMPICO, MEXICO.

GAS-SEPARATOR APPARATUS.

Application filed March 26, 1924. Serial No. 702,116.

*To all whom it may concern:*

Be it known that I, CHARLES F. W. TABLER, a citizen of the United States, and a resident of Tampico, Mexico, have invented certain new and useful Improvements in Gas-Separator Apparatus, of which the following is a specification.

This invention relates to an apparatus for separating fluids of a high specific gravity from fluids of a low specific gravity when said fluids are mechanically mixed and which are ordinarily difficult of separation.

An object of the invention is the provision of a device for effecting the separation of gasoline from very lean gases which may be either taken from the still, casing heads of oil wells or the natural gases and in which the combined effect of centrifugal separators and a refrigeration cooperate to completely separate the fluids and impurities.

A further object of the invention is the provision of a device in which the separated gasoline is maintained under pressure and then expanded in a drum embracing conduits through which the concentrated gases under treatment and vapors are passed for chilling and condensing the rich vapors in the gas.

A still further object of the invention is the provision of a device for maintaining lean gases under sufficient pressure to cause condensation of the gasoline vapors and in which the waste gases under pressure are permitted to expand in the refrigerating chambers associated with the conduit through which the oil laden gases are passed under pressure.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 discloses more or less diagrammatically an apparatus for separating fluids of high specific gravity from fluids of lower specific gravity.

Figure 2 is a modified form of centrifugal separator partly in section adapted to be employed for the splitting up of rich compound still vapors into vapors whose respective liquids respond to the commercial classification for instance, gas oil, naphtha, gasoline, etc.

Figure 3 is a horizontal section of a separator taken along the line 3—3 of Figure 2.

Figure 4 is a view in elevation of another form of separator partly in section adapted to be employed in treating waste gases from plants already in existence, such as stills, natural gas plants, or casing heads of oil wells.

Referring more particularly to the drawings, 1 designates a vertical drum in which is placed a spiral 2 supported at its center by a rod 3 and has its peripherally curved edge in close contact or secured to the inner wall of the drum 1. An inlet pipe 4 is adapted to be connected to a pipe line from the casing head of an oil well or from the piping connected with the natural gas wells or the drum 1 may be connected to the piping from a still or waste gas line.

Spaced from the lower end of drum 1 is a pipe or drum 5 of the same diameter as drum 1 to form a peripheral outlet 6 for the lower end of the centrifugal separator in the drum 1. This peripheral outlet opens into a chamber 7 formed by welding or securing in any approved manner a sleeve 8 of larger diameter than the drum 1 in such a way that the upper end of the sleeve is closed and secured to the drum 1 while the lower end of said sleeve is secured in close relation to the drum 5. The bottom of the chamber 7 is higher at one end than its other end, the lower end being provided with an outlet 9 in order to drain the centrifugally separated gasoline vapors into a pipe 10. The lower end of the drum 5 has a discharge outlet 11 which is controlled by a valve 12 and adapted to maintain the gas and oil vapors under pressure. The dry gas is permitted to escape from the outlet 11 in quantities which is regulated by the valve 12. The dry gas discharged from the centrifugal separator 1 is used about the oil plant for any purpose that may be desirable.

The pipe 10 leads directly to the intake of a compressor 13 whereby the vapors are withdrawn from the chamber 7 and forced under pressure through conduit 14 into a second drum 15 having a spiral track 16 which causes a whirling motion of the gases and vapors without unduly agitating the same. Rotary motion of the gases passing through the spiral path 16 causes the heavier portions of the vapors to be thrown outwardly towards the wall of the drum and which escape through the annular passage 17 formed between the upper end of the drum 15 and the lower end of drum 18.

The spaced ends of the drums are embraced or enclosed by a casing 19 which is provided with openings through its upper and lower ends to receive the adjacent ends of the drums 15 and 18. The casing 19 is welded or secured in any approved manner to the vertically alined drums. The lower end of the bottom of the casing 19 is inclined and provided with an opening 20 for the reception of one end of a pipe 21, the other end of the pipe being passed through the wall of a reservoir 22 and spaced from the bottom of the reservoir to permit the impurities separated from the gases and vapors to be collected. A pipe 23 connected at its lower end with the reservoir 22 projects through the drum 18 and terminates in a nozzle at 24 adjacent the upper closed end of said drum and adjacent its outlet which is clamped to pipe 24ª. The pipe 24ª is connected with cooling coils 25 which are vertically disposed in the path of an elongated trough which is supplied with water. The lower end of the trough has a narrow opening to permit a regulated flow of water to fall upon the coils 25.

The aspirating effect of the vapors and gases passing from the drum 18 into pipe 24ª tends to cause a withdrawal of gases and uncondensed vapors from the reservoir 22 through the pipe 23 and into the cooling coils 25. The container 22 has a few ounces greater pressure than the chamber 18 and this also aids in causing the gases and vapors in container 22 to be discharged into the cooling coils 25.

The vapors and gases in the coils 25 are cooled to substantially atmospheric temperature and then are passed through a pipe 28 into the bottom of a stand pipe 29, which is filled substantially with water. The vapors must pass through a fine mesh screen 30 formed at the bottom of the stand pipe whereby they are broken up into minute particles so that the vapors will be thoroughly washed as they reach the top and discharged into the connection 31 leading to a third centrifugal separator mounted in the drum 32.

The pressure of the vapors against the head of water in the pipe or drum 29 is sufficient to maintain the water in said pipe at a desired elevation. The greater portion of the sulphur is removed by the washing in member 29 before entering the last centrifugal separator.

The drum 32 contains a spiral 33 which causes gases to be carried downwardly and in a rotary motion to the lower end of the drum where said drum is spaced from a second drum of like diameter to provide an annular port 35 for permitting the condensed vapors which are now formed into gasoline to pass into a chamber 36 formed by providing a partition 37 between the walls of the drum 32 and an embracing drum 38.

The bottom of chamber 35 is inclined and at its lower end is provided with an opening embraced by the inner end of a discharge conduit 39. This conduit permits the gasoline, water and precipitated sulphur compounds to pass into a chamber 40 having an outlet pipe 41 projecting into a water trap 42. This water trap, because of the accumulation of the water which is condensed from the gas of the vapors collecting in said reservoir, must be emptied every eight hours, otherwise the water would fill in and back up into the gas pipe 43 and into the refrigerating chamber 44 between the outer drum 38 and inner drum 32. This water would freeze, due to the low temperature in the refrigerating chamber and injure the apparatus.

Floating upon the top of the water in the storage tank 32 is found precipitated sulphur compounds and a great quantity of gasoline collects above the sulphur in the space designated by the numeral 45. This gasoline is still under pressure of 120 pounds and as the gasoline gradually fills into the storage tank, it rises in pipe 43 and is admitted to the chamber 44 through the opening of an expansion valve 46. When the gasoline under pressure is admitted to the chamber 44 it is permitted to expand and due to this expansion reduces the temperature to such an extent that the vapors passing through the drum 32 are chilled and the condensed and chilled heavier portions of the fluids collect upon the inner walls of the drum and are carried downwardly and discharged through the annular opening 35 into the chamber 36. The vapors and gases passing through the drum 32 are exposed to the cold condensed gasoline and impurities which have been thrown out by centrifugal force against the walls of the separator of the drum 32.

The gasoline from the refrigerating chamber 44 passes through a connection 47 into a chamber 48 formed between the stand pipe or drum 29 and an embracing drum 49 where it again is employed for chilling the oil laden water in the drum 29. A pipe 50 connected with the chamber 49 carries the gasoline to a storage tank 51 located at any convenient point around the oil plant.

The chamber 40 has a valve connection 52 with the lower end of the drum 32 where the lower end of said drum is connected with a discharge conduit 53. The dry gases from drum 32 pass through conduit 53 through conduit 54 to a casing 55 which embraces the pipe 28. The aspirating effect of the dry gases from drum 32 passing the mouth 50 of the connection 52 and through the passage in the Venturi tube 60 extends to withdraw any gases which may have escaped in the chamber 40.

The expanding gases in the casing 55 aid in further cooling the vapors and the gases after they have left the cooling coils 25. The final waste gases are discharged through the outlet 56 and such gases are carried to any convenient point for utilization as by burning in the furnaces or for heating boilers for the generation of steam.

The lower end of reservoir 42 is provided with a valve controlled discharge outlet 58 for draining the water and impurities which have collected in said reservoir.

The valve 57 formed in the pipe line 54 where said pipe is connected with the casing 55 is adapted to maintain the pressure of the gases in the pipe 54 and in all sections of the system preceding said conduit. When the valve 57 is opened the gases under pressure are allowed to expand in the casing 55 and thereby aid in reducing the temperature of the vapors passing through the conduit 28.

It must be borne in mind that it is desirable to provide a rotary motion in centrifugal separators in order to cause the centrifugal action to discharge at all times in each separator the heavier elements of the fluid along the walls of the drum enclosing the separator and it is especially desirable to form the spiral in such a manner as to avoid any eddying currents, otherwise the centrifugal separation will not be properly effected.

In the centrifugal separator within drum 32 the final separation and condensation of the gasoline vapors is had. It is at this point that any gasoline vapors contained in the gases passing through such separator come into contact with the chilling surface of the drum and the chilled hydrocarbon passing along the inner walls of the drum 32 and as these vapors are rotated under pressure all the gasoline that remains in the gas is condensed and discharged into the chamber 40 together with precipitated sulphur compounds.

It must be bore in mind that where the vapors entering the drum 1 are not under pressure that some form of pump may be employed for forcing the oil laden gases through the separator and in connection with the pump 31 the pressure is raised at this point to a pressure of not more than 120 pounds. The initial pressure of the gas entering drum 1 is usually about 20 to 25 pounds.

Referring more particularly to Figure 2 a centrifugal separator is shown adapted to be employed for the recovery of gasoline from the vapors coming from stills. In this device a plurality of drums 61, 62 and 63 are disposed in vertical alinement and are separated from each other by the annular passages 64. Upon the lower end of each drum is integrally cast or welded a casing 65 of larger diameter than the drum 61, 62 or 63, with the larger end 66 of each casing being mounted or secured in any approved manner to the upper adjacent ends of the vertically alined drums. Each of the lower ends of the casing is provided with an enlarged chamber 66 which are connected with an outlet 67. The lower end of drum 63 is spaced from a drum 68 to provide an annular passage 69 into the chamber formed between the casing 65 and the drum 68. It will be noted that the discharge outlets 67 are located at various intervals along the height of the separator so that the oil thrown out centrifugally towards the walls of the drum by the spiral 70 is withdrawn periodically. The spiral track 70 has its outer periphery in close contact with the inner walls of the drums 61, 62 and 63 to prevent the vapors from discharging past their edges. A rod 71 mounted centrally in the drum aids in supporting the spiral track in position.

An inlet 72 tangentially connected with the drum 61 is adapted to be connected with a pipe line upon the still for admitting the oil vapors to the separator.

Referring to Figure 4 a separator is shown for treating very lean gases such as natural gas which is adapted to be employed in place of the usual absorption plant. In this device a drum 73 is concentrically disposed within an outer drum 74 and has its lower end spaced from a drum 75 to provide an annular passage 76 from the drum 73 to a chamber 77 formed between the lower end of the drum 74 and the connected adjacent ends of the drums 73 and 75. An annular baffle 78 is located between the drums 73 and 74 adjacent the lower end of drum 73. A spiral track 79 carried by a rod 80 is disposed within the drum 73 for causing the oil laden gases to have a rotary motion when passing from the inlet 81 to the discharge outlet 82.

The chamber 77 is connected by a conduit 83 with a reservoir 84 which has a discharge outlet 85 for the removal of condensed gasoline. A baffle 86 is disposed centrally of the reservoir 84 and has its lower end spaced from the bottom of the reservoir which permits any gases which have passed through pipe 83 to the reservoir to travel around said baffle and enter a discharge conduit 85 which has its upper end 86 opening into the discharge outlet 82. The aspirating effect of the gases from drum 73 passing the discharge outlet 86 will aid in causing withdrawal of any gases from the reservoir 84. The discharge pipe 82 is connected by a return bend 87 to a chamber 88 formed between the upper ends of the drums 73 and 74 to permit the lean gases to enter the chamber 88 and cool the drum 73 including the centrifugal separator 79. These gases are under pressure when leaving the separator and as they enter the chamber 88 they expand for refrigeration purposes.

A release valve 89 having a stem 90 is adapted to maintain a predetermined degree of pressure in the system through the lever 91 and the weight 92 which is connected to the valve stem 90. The dry gases escape through the discharge outlet 93.

The construction of the centrifugal separator in Figure 4 is similar to the construction of the separator in Figures 1 and 2 and the same novel features of the spiral track and the separated adjacent ends of the pair of drums for forming an outlet for the heavier portions of the gases or vapors is includede in the construction.

What I claim is:

1. An apparatus of the class described comprising in combination, a centrifugal separator adapted to be connected to a source of supply of oil laden gas, a pump connected with the outlet end of the separator for withdrawing the condensed portions of the gases and for placing said portions and lean gases under greater pressure, a centrifugal separator connected with the discharge end of the pump for receiving the condensed portions and gases to cause separation of discoloring matter from the condensed portions, cooling coils connected with the outlet of the second centrifugal separator, a vertically disposed drum connected with the cooling coils in which a predetermined level of water is adapted to be maintained and through which the condensed portions and the gases may be passed, a refrigerating chamber enclosing the drum, a centrifugal separator connected to the top of the drum, a refrigerating chamber embracing the last mentioned separator, a pipe connecting the two refrigerating chambers, a tank adapted to receive the condensed gasoline under pressure, a valved connection between the storage tank and the last mentioned refrigerating chamber whereby the gasoline under pressure is permitted to escape to and expand in the refrigerating chamber for cooling the last mentioned centrifugal separator and the drum in which the gases are washed.

2. An apparatus of the class described comprising in combination, a centrifugal separator adapted to be connected to a source of supply of oil laden gas, means for releasing the dry gases from the separator, a pump connected with the outlet end of the separator for withdrawing the condensed portions of the gases and for placing the condensed portions and lean gases under greater pressure, a centrifugal separator connected with the discharge end of the pump for receiving the condensed portions and gases to cause separation of discoloring matter from the condensed portions, cooling coils connected with the outlet of the second centrifugal separator, a vertically disposed drum connected with the cooling coils, in which a predetermined level of water is adapted to be maintained and through which the condensed portions and the gases may be passed, means located in the bottom of the drum for breaking up the condensed portions into minute particles, a refrigerating chamber enclosing the drum, a centrifugal separator connected to the top of the drum, a refrigerating chamber embracing the last mentioned separator, a pipe connecting the two refrigerating chambers, a tank adapted to receive the condensed portions under pressure from the last mentioned separator, a valved connection between the storage tank and the last mentioned refrigerating chamber whereby the gasoline under pressure is permitting to escape to and expand in the refrigerating chamber for cooling the last mentioned centrifugal separator and the drum in which the gases and condensed portions are washed.

3. An apparatus of the class described compirsing in combination, a centrifugal separator adapted to be connected to a source of supply of oil laden gas, means for releasing the dry gases from the separator, a chamber connected with the separator adapted to receive the condensed portion of the gases and the remainder of the gas, a pump connected with the chamber for withdrawing the condensed portions and gas from said chamber and increasing the pressure on the condensed portions and gas, a centrifugal separator connected with the discharge end of the pump for receiving the condensed portions to cause further separation of said portions and gases, cooling coils connected with the outlet of the second centrifugal separator, a vertically disposed drum connected with the cooling coils in which a predetermined level of water is adapted to be maintained and through which the condensed portions and the gases may be passed, a refrigerating chamber enclosing the drum, a centrifugal separator connected to the top of the drum, a refrigerating chamber embracing the last mentioned separator, a pipe connecting the two refrigerating chambers, a tank adapted to receive the condensed oil vapors under pressure, a valved connection between the storage tank and the last mentioned refrigerating chamber whereby the fluid gasoline product under pressure is permitted to escape to and expand in the refrigerating chamber for cooling the last mentioned centrifugal separator and the drum in which the gases and condensed portions are washed.

4. In an apparatus of the class described comprising a pump for imparting a predetermined degree of pressure on oil laden gases, a centrifugal separator connected with the discharge end of the pump for receiving the condensed portions of the gases to cause separation of impurities from the condensed portions, cooling coils connected with the outlet of the second centrifugal separator, a vertically disposed drum connected with the cooling coils in which a predetermined level of water is adapted to be maintained through which the condensed portions of the gases may be passed, a refrigerating chamber enclosing the drum, a centrifugal separator connected to the top of the drum, a refrigerating chamber embracing the last mentioned separator, a pipe connecting the two refrigerating chambers, a tank adapted to receive the condensed gasoline under pressure, a valved connection between the storage tank and the last mentioned refrigerating chamber whereby the compressed gasoline is permitted to escape to and expand in the refrigerating chamber for cooling the last mentioned centrifugal separator and the drum in which the condensed portions were washed.

5. In an apparatus of the class described comprising in combination means for condensing the heavier portions of oil laden gases, a pump for imparting a predetermined degree of pressure on said heavier portions and gases, cooling coils connected with the pump, a vertically disposed drum connected with the cooling coils in which a predetermined level of water is adapted to be maintained and through which the condensed portions and the gases may be passed, a refrigerating chamber enclosing the drum, a centrifugal separator connected to the top of the drum, a refrigerating chamber embracing the last mentioned separator, a pipe connecting the two refrigerating chambers, a tank adapted to receive the condensed gasoline under pressure, a valved connection between the tank and the last mentioned refrigerating chamber whereby the compressed gasoline is permitted to escape to and expand in the refrigerating chamber for cooling the last mentioned centrifugal separator and the drum in which the heavier portions of the gases were washed.

6. An apparatus of the class described comprising in combination, a centrifugal separator adapted to be connected to a source of supply of oil laden gas, a pump connected with the outlet end of the separator for withdrawing the condensed portions and limited quantity of gases and for placing the condensed portions and lean gases under greater pressure, a centrifugal separator connected with the discharge end of the pump for receiving said heavier portions and gases to cause separation of foreign matter from the gases, cooling coils connected with the outlet of the second centrifugal separator, a vertically disposed drum connected with the cooling coils in which a predetermined level of water is adapted to be maintained and, a refrigerating chamber enclosing the drum, a centrifugal separator connected to the top of the drum, a refrigerating chamber embracing the last mentioned separator, a pipe connecting the two refrigerating chambers, a tank adapted to receive the condensed gasoline under pressure, a valved connection between the tank and the last mentioned refrigerating chamber whereby the compressed gasoline is permitted to escape to and expand in the refrigerating chamber for cooling the last mentioned centrifugal separator and the drum in which the clean gases and condensed portions are washed, a casing enclosing the connection between the cooling coils and the vertically disposed drums, and means connecting the last mentioned separator with said casing for admitting lean gases from the chamber to expand in said casing for cooling the connection.

7. In an apparatus of the class described, a centrifugal separator comprising a hollow drum closed at its upper end, a drum closed at its lower end and in vertical alinement with the first mentioned drum and with the adjacent open ends of the drums spaced from each other to provide an annular passage therebetween, a spiral track located in the upper drum and projecting for a portion of its length into the lower drum, and a second drum embracing the pair of alined drums and having its lower end inclined at an angle to the horizontal for aiding in the ready discharge of the liquids from said drum.

8. In an apparatus of the class described, a centrifugal separator comprising a hollow drum closed at its upper end, a drum closed at its lower end and in vertical alinement with the first mentioned drum and with the adjacent open ends of the drums spaced from each other to provide an annular passage therebetween, a spiral track located within the drums, a casing embracing the separated ends of the drums to provide a chamber to receive the fluids of heavier specific gravity which are separated from fluids of lighter specific gravity in the separator, the spiral track extending across the spaced ends of the alined drums whereby fluids thrown outwardly by the spiral track are discharged through the space between said drums.

9. In a device of the class described, a centrifugal separator, a casing surrounding the separator, means for forcing oil laden gases through the separator under pressure, a conduit connecting the discharge end of the separator with the casing, a valve for controlling the flow of the condensed portions of the gases under pressure from the separator to the casing, said condensed portions adapted to expand in the casing for cooling the separator.

10. In a device of the class described, a vertically disposed drum adapted to contain a predetermined height of water, a pump connected with said drum for forcing oil laden gas through the drum, a casing embracing the drum, a centrifugal separator connected with the drum, a casing embracing the separator and in communication with the casing enclosing the drum, a conduit connecting the discharge end of the separator with the second mentioned casing for permitting the separated condensed portions of the gases under pressure from the separator to enter the casings and expand for cooling the vertically disposed drum and the separator.

11. In a device of the class described, a vertically disposed drum adapted to contain a predetermined height of water, a pump connected with said drum for forcing oil laden gas through the drum, a casing embracing the drum, a centrifugal separator connected with the drum, a casing embracing the separator and in communication with the casing enclosing the drum, a casing embracing the lower end of the separator and in communication with the separator to provide a chamber to receive the centrifugally separated fluids of heavier specific gravity, a reservoir connected with said chamber to receive condensed gasoline from the separator, said separator being provided with a gas discharge outlet, a valve connection between the reservoir and the gas discharge outlet of the separator whereby the discharge of the gas from the separator has an aspirating effect upon the valve connection for withdrawing lean gases from the reservoir.

12. In a device of the class described, a vertically disposed drum adapted to contain a predetermined height of water, a pump connected with said drum for forcing oil laden gas through the drum, a casing embracing the drum, a centrifugal separator connected with the drum, a casing embracing the separator and in communication with the casing enclosing the drum, a casing embracing the lower end of the separator and in communication with the separator to provide a chamber to receive the centrifugally separated fluids of heavier specific gravity, a reservoir connected with said chamber to receive the separated condensed gasoline from the separator, said separator being provided with a gas discharge outlet, a valve connection between the reservoir and the gas discharge outlet of the separator whereby the discharge of the gas from the separator has an aspirating effect upon the valve connection for withdrawing lean gases from the reservoir, a tank connected to the reservoir for receiving the condensed gasoline and separated foreign matter, and a conduit connecting the tank with the chamber embracing the separator, a valve in the conduit for controlling the flow of gasoline under pressure to the chamber, said gasoline being permitted to expand in the chamber, formed between the casing and the separator for cooling the separator.

13. A centrifugal separator comprising a plurality of open ended drums arranged in vertical alinement and having their adjacent ends spaced from each other, an end of each drum being enlarged to form casing connected with the portion of the adjacent end of another drum for forming a chamber enclosing the spaced ends of the drums, a discharge outlet connected with each of the casings, an inlet connected with the upper end of the topmost drum for admitting oil laden gases to the drums, and a spiral track disposed within the drums to cause a whirling motion of the gases passing through the drums.

14. In an apparatus of the class described comprising a vertically disposed drum, a spiral track mounted within the drum, the upper end of the drum being closed, a second drum disposed in vertical alinement with the first mentioned drum and having its upper end spaced from the adjacent end of the first mentioned drum and provided with a discharge outlet, the lower end of the second drum being closed, a casing surrounding the drums, a baffle located between the wall of the first mentioned drum and the casing for isolating the upper portion of the chamber between the drums and the casing from the lower portion of the chamber formed between the drums and the casing, a reservoir having a centrally disposed baffle depending from the inner face of the top, a conduit connecting the lower chamber between the drums and the casings with the reservoir at one side of the baffle, a conduit connecting the reservoir at the opposite side of the baffle with the lower end of the second drum adjacent its discharge outlet, said discharge outlet being connected with the upper chamber located between the first mentioned drum and the casing for permitting the dry gases from the separator to pass into said chamber and expand for cooling the separator.

15. In an apparatus of the class described comprising a vertically disposed drum, a spiral track mounted within the drum, the upper end of the drum being closed, a second drum disposed in vertical alinement with the first mentioned drum and having its upper end spaced from the adjacent end of the first mentioned drum and provided with a discharge outlet, the lower end of the second drum being closed, a casing surrounding the drums, a baffle located between the wall of the first mentioned drum and the casing for isolating the upper portion of the chamber between the drums and the casing from the lower portion of the chamber formed between the drums and the casing, a reservoir having a centrally disposed baffle depending from the inner face of the top, a conduit connecting the lower chamber between the drums and the casing with the reservoir at one side of the baffle, a conduit connecting the reservoir at the opposite side of the baffle with the lower end of the second drum adjacent its discharge outlet, said discharge outlet being connected with the upper chamber located between the first mentioned drum and the casing for permitting the dry gases from the separator to pass into said chamber and expand for cooling the separator, and a relief valve in the connection between the separator and the upper chamber.

16. In an apparatus of the class described comprising a vertically disposed drum, a spiral track mounted within the drum, the upper end of the drum being closed, a second drum disposed in vertical alinement with the first mentioned drum and having its upper end spaced from the adjacent end of the first mentioned drum and provided with a discharge outlet, the lower end of the second drum being closed, a casing surrounding the drums, a baffle located between the wall of the first mentioned drum and the casing for isolating the upper portion of the chamber between the drums and the casing from the lower portion of the chamber formed between the drums and the casing, a reservoir, a conduit connecting the lower chamber between the drums and the casing with the reservoir, a conduit connecting the reservoir with the lower end of the second drum adjacent its discharge outlet, said discharge outlet being connected with the upper chamber located between the first mentioned drum and the casing for permitting the dry gases from the separator to pass into said chamber and expand for cooling the separator.

17. A centrifugal refrigerating agitator comprising a drum, one end of the drum being provided with an inlet for liquids and gases under treatment, the other end being provided with an outlet, a stationary, uniform and continuous spiral track consisting of a plurality of complete turns and extending the substantially length of said drum, a collecting chamber for the condensed liquids, a casing surrounding the first mentioned drum and provided with inlet and outlet conduits for the admission and discharge, respectively, of a suitable refrigerant.

18. In a device of the class described, a vertically disposed drum adapted to contain a predetermined height of water, a pump connected with the drum for forcing water, gas and other liquids through said drum, a column mounted in the drum adapted to receive the water from the pump at the bottom of the column, a discharge opening at the upper end of the column, a casing embracing the drum, said casing being provided with inlet and outlet conduits for the circulation of a suitable refrigerant.

19. In an apparatus of the class described, a centrifugal separator, having a small internal diameter, comprising a drum, one end of the drum being provided with an inlet for liquids and gases under treatment, the other end of the drum having the interior of its wall beveled to an annular edge, a second drum disposed in alinement with the first mentioned drum and having its end beveled along its annular edge, said beveled end being spaced from the beveled end of the first drum to form an annular port, a housing embracing said port and provided with a suitable outlet, the other end of the second drum having a suitable outlet, a stationary, continuous and symmetrical spiral track consisting of a plurality of complete turns, mounted within the first drum and extending beyond the annular port formed by the spaced beveled ends of the two drums, a casing surrounding the first mentioned drum provided with inlet and outlets for the circlulation of a suitable refrigerant.

CHARLES F. W. TABLER.